Figure 1A:
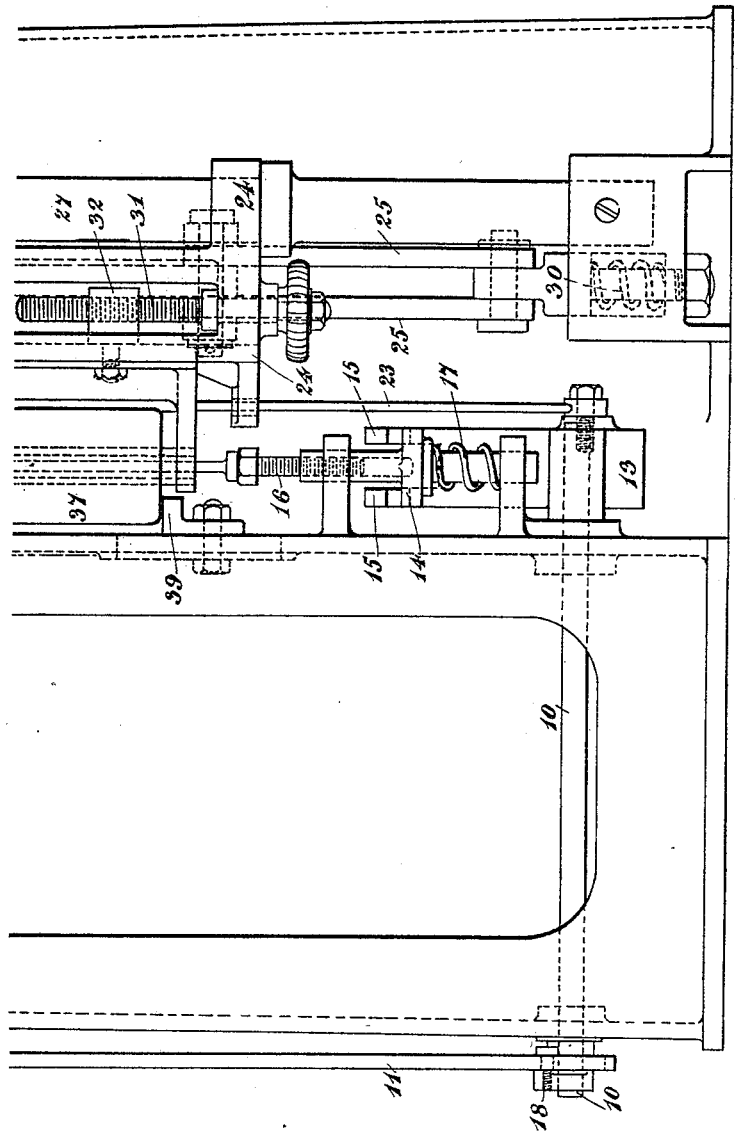

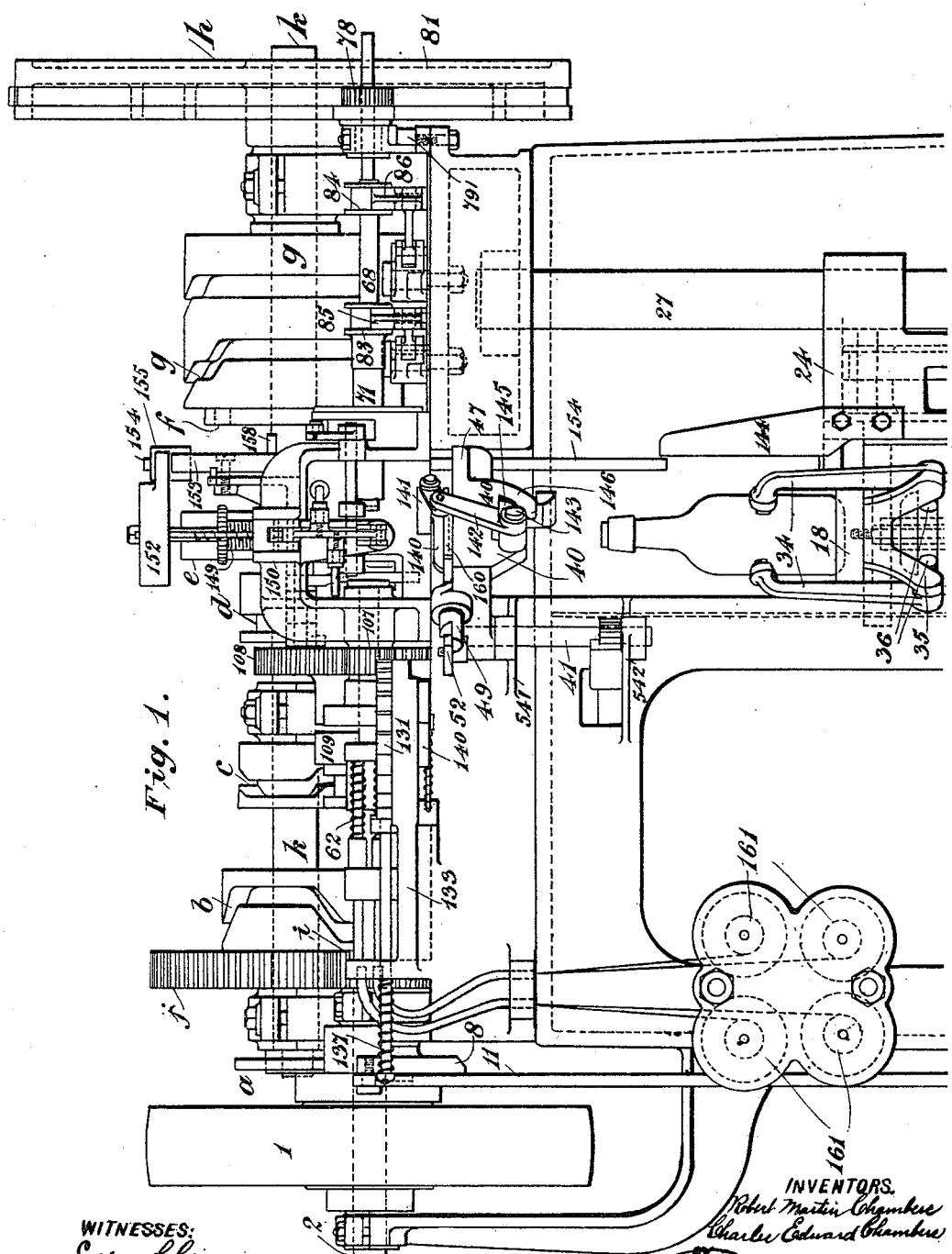

No. 632,174. Patented Aug. 29, 1899.
R. M. & C. E. CHAMBERS.
MACHINE FOR WIRING BOTTLES.
(Application filed Apr. 29, 1899.)

(No Model.) 16 Sheets—Sheet 2.

WITNESSES:
INVENTORS.
Robert Martin Chambers
Charles Edward Chambers
BY
Richard R.
ATTORNEYS

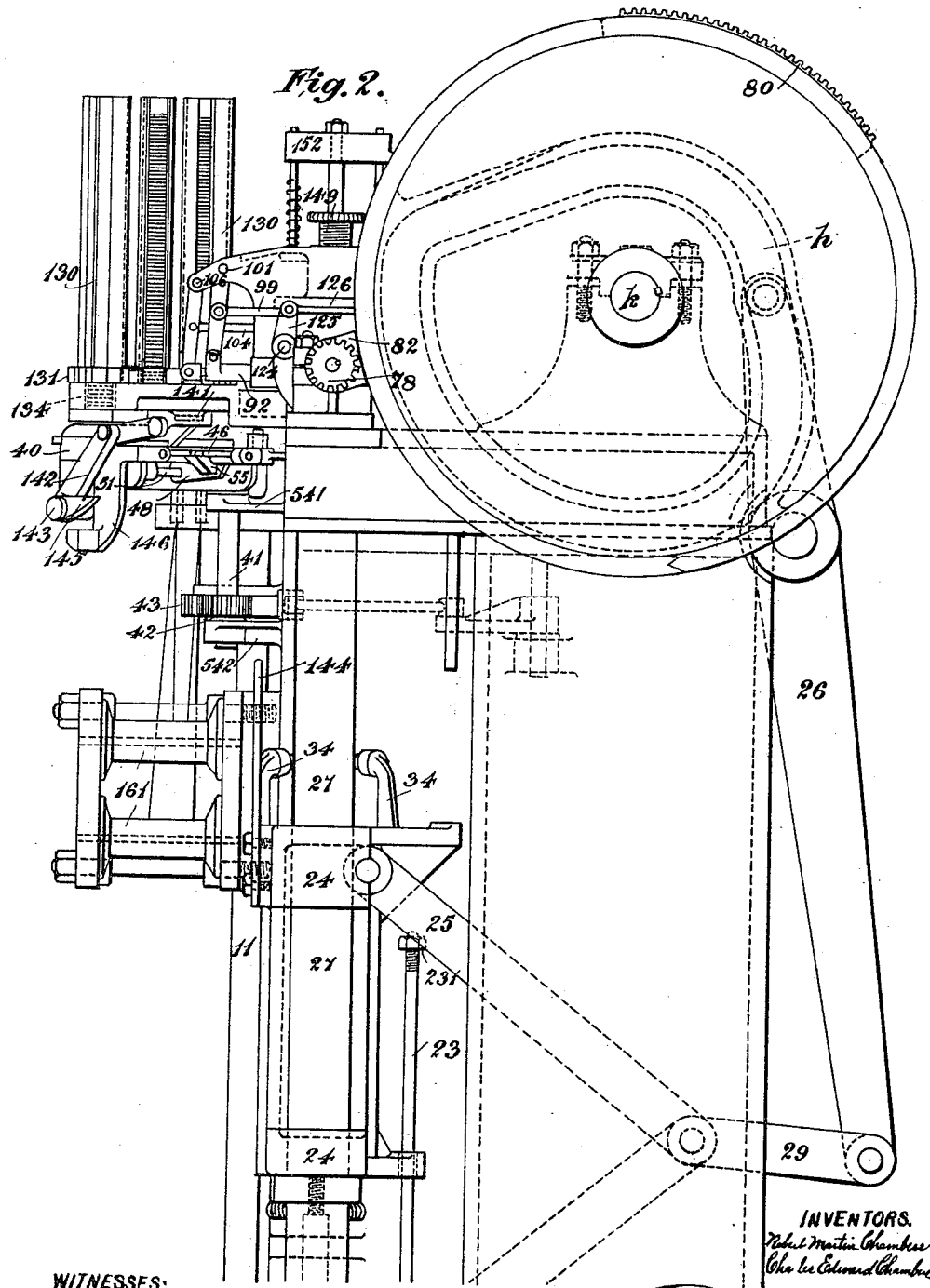

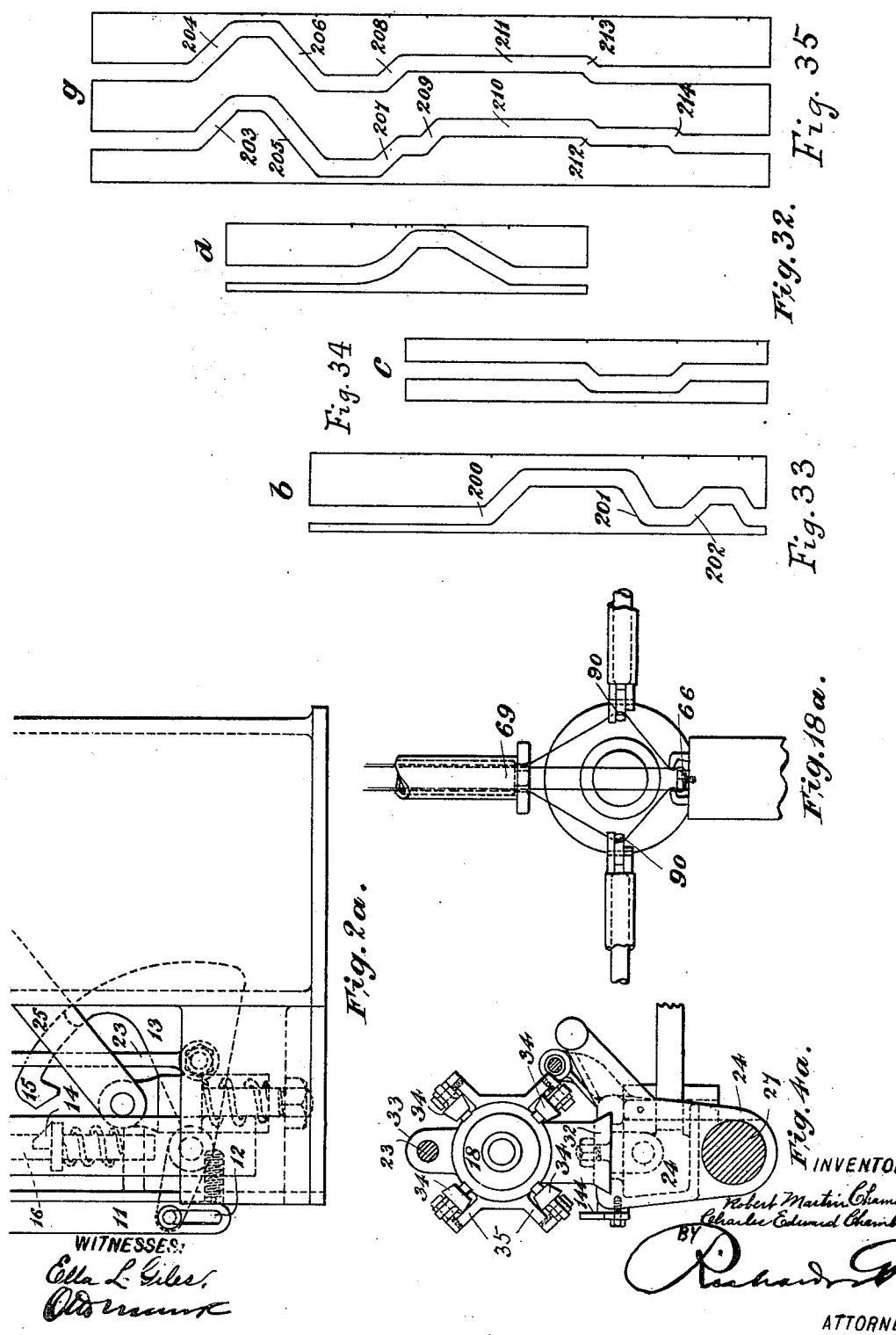

No. 632,174. Patented Aug. 29, 1899.
R. M. & C. E. CHAMBERS.
MACHINE FOR WIRING BOTTLES.
(Application filed Apr. 29, 1899.)
(No Model.) 16 Sheets—Sheet 5.
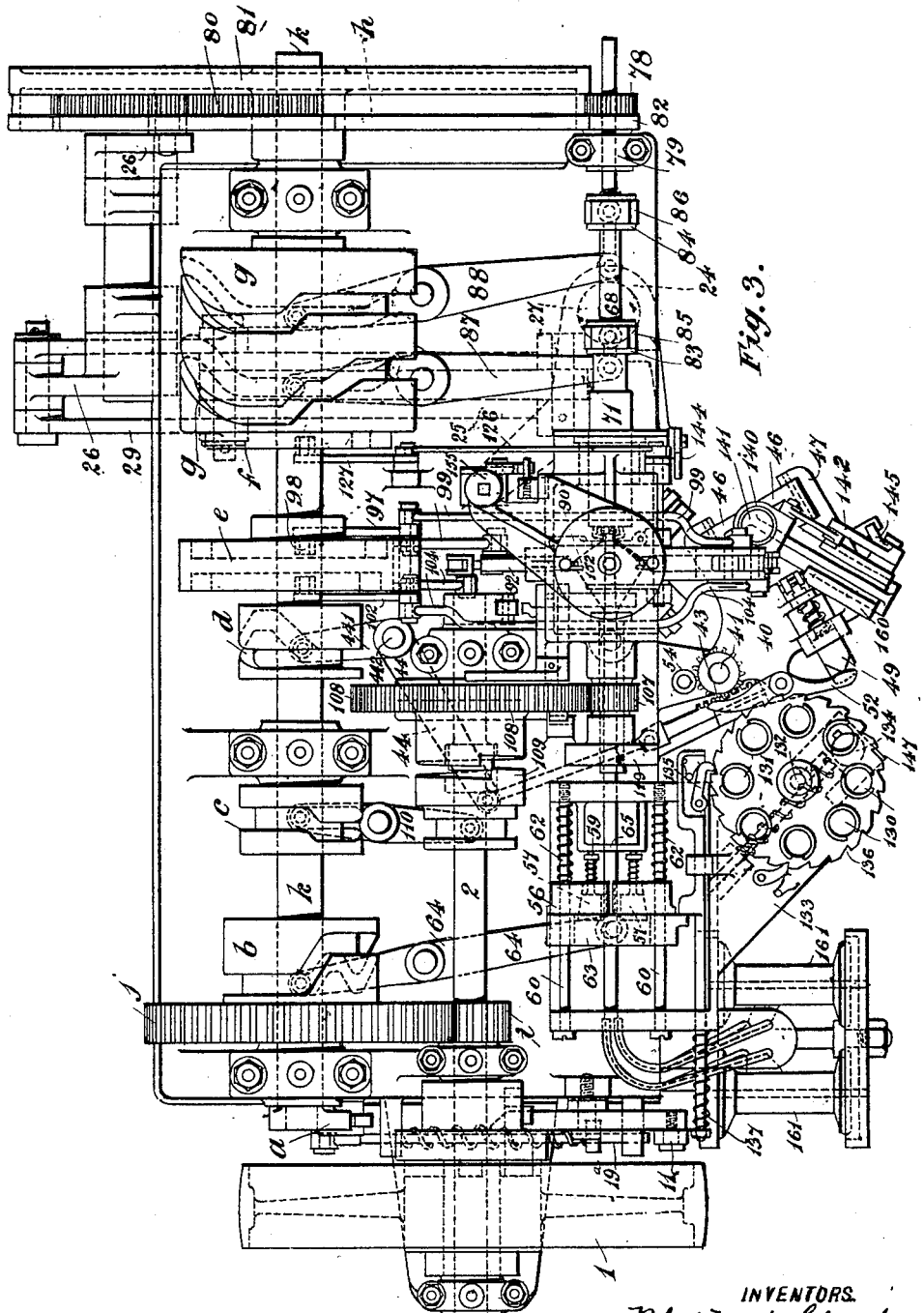
WITNESSES:
INVENTORS.
Robert Martin Chambers
Charles Edward Chambers
BY
Richard R
ATTORNEYS No. 632,174. Patented Aug. 29, 1899.
R. M. & C. E. CHAMBERS.
MACHINE FOR WIRING BOTTLES.
(Application filed Apr. 29, 1899.)

(No Model.) 16 Sheets—Sheet 6.

WITNESSES:
Ella L. Giles

INVENTORS.
Robert Martin Chambers
Charles Edward Chambers
BY Richardson
ATTORNEYS

THE NORRIS PETERS CO., PHOTO-LITHO., WASHINGTON, D. C.

No. 632,174. Patented Aug. 29, 1899.
R. M. & C. E. CHAMBERS.
MACHINE FOR WIRING BOTTLES.
(Application filed Apr. 29, 1899.)

(No Model.) 16 Sheets—Sheet 7.

WITNESSES:
Ella L. Giles

INVENTORS.
Robert Martin Chambers
Charles Edward Chambers
BY
Richards
ATTORNEYS

No. 632,174. Patented Aug. 29, 1899.
R. M. & C. E. CHAMBERS.
MACHINE FOR WIRING BOTTLES.
(Application filed Apr. 29, 1899.)

(No Model.) 16 Sheets—Sheet 8.

Fig. 9.

WITNESSES:

INVENTORS
Robert Martin Chambers
Charles Edward Chambers
BY
Richardson
ATTORNEYS

THE NORRIS PETERS CO., PHOTO-LITHO., WASHINGTON, D. C.

No. 632,174. Patented Aug. 29, 1899.
R. M. & C. E. CHAMBERS.
MACHINE FOR WIRING BOTTLES.
(Application filed Apr. 29, 1899.)
(No Model.) 16 Sheets—Sheet 9.

WITNESSES:
INVENTORS,
Robert Martin Chambers
Charles Edward Chambers
BY
Richardson
ATTORNEYS No. 632,174. Patented Aug. 29, 1899.
R. M. & C. E. CHAMBERS.
MACHINE FOR WIRING BOTTLES.
(Application filed Apr. 29, 1899.)
(No Model.) 16 Sheets—Sheet 10.
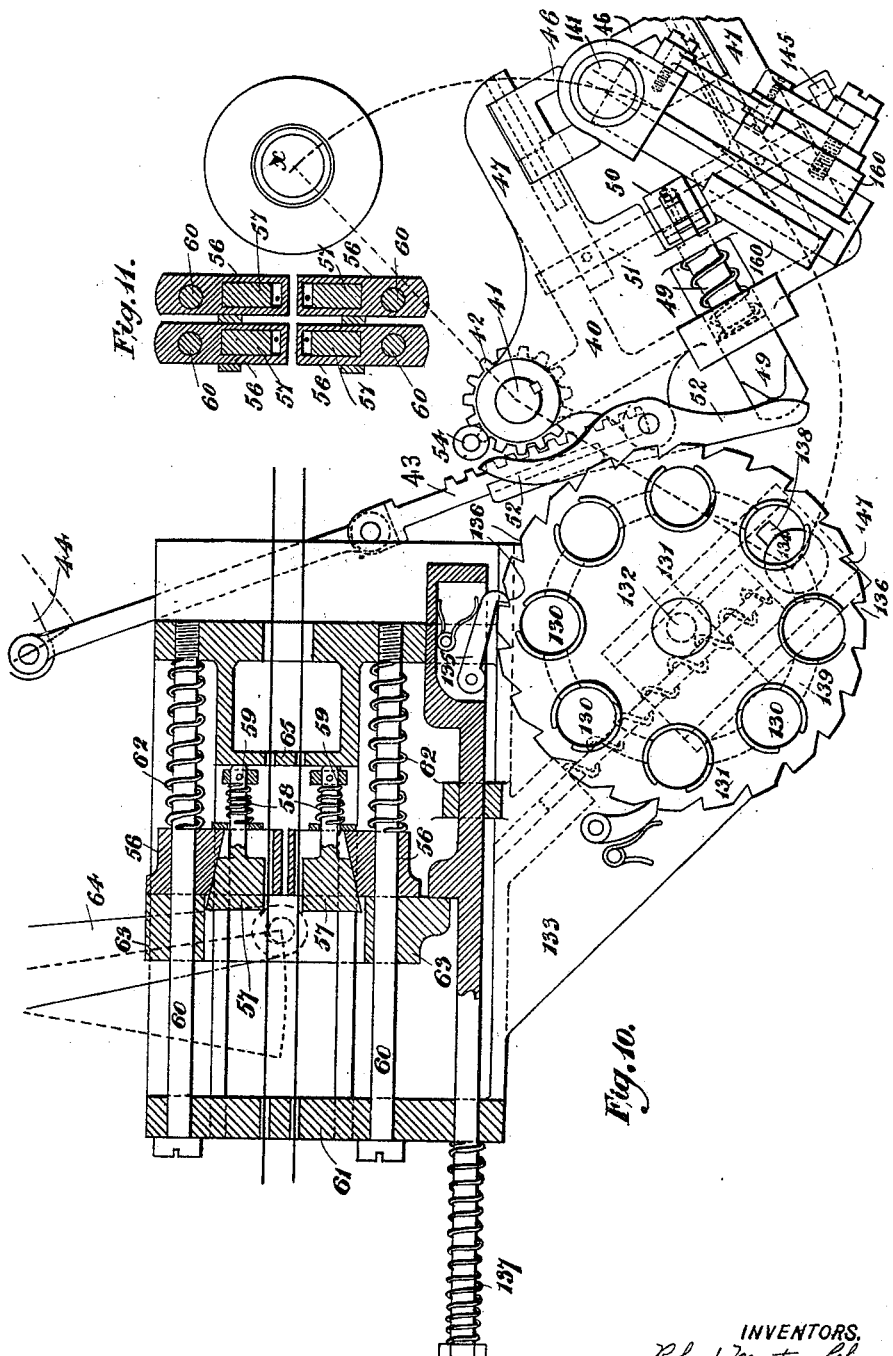
INVENTORS.
Robert Martin Chambers
Charles Edward Chambers
BY
ATTORNEYS
WITNESSES:

No. 632,174.  
R. M. & C. E. CHAMBERS.  
MACHINE FOR WIRING BOTTLES.  
(Application filed Apr. 29, 1899.)
Patented Aug. 29, 1899.
(No Model.)
16 Sheets—Sheet 11.
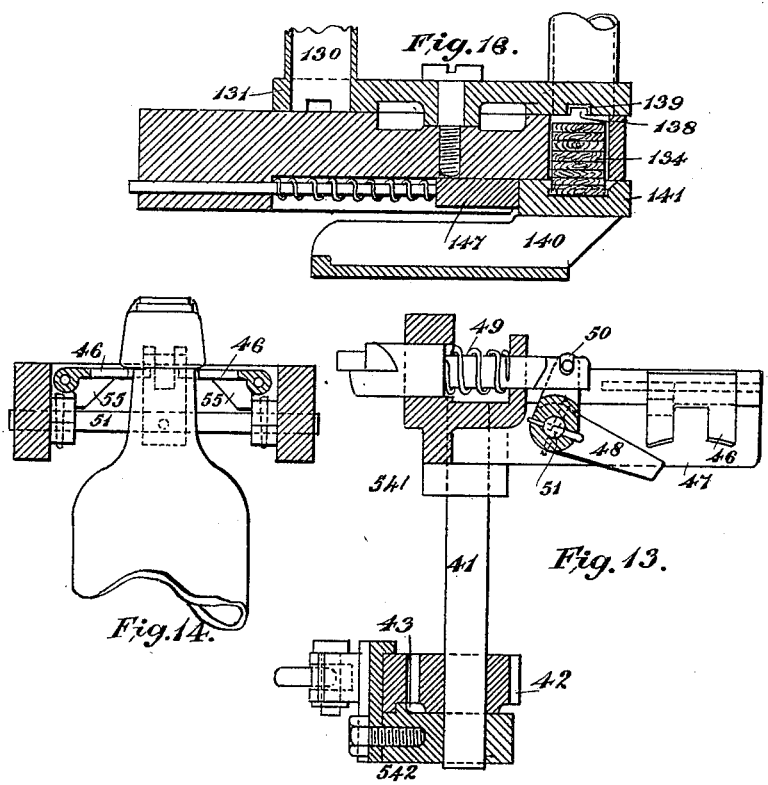
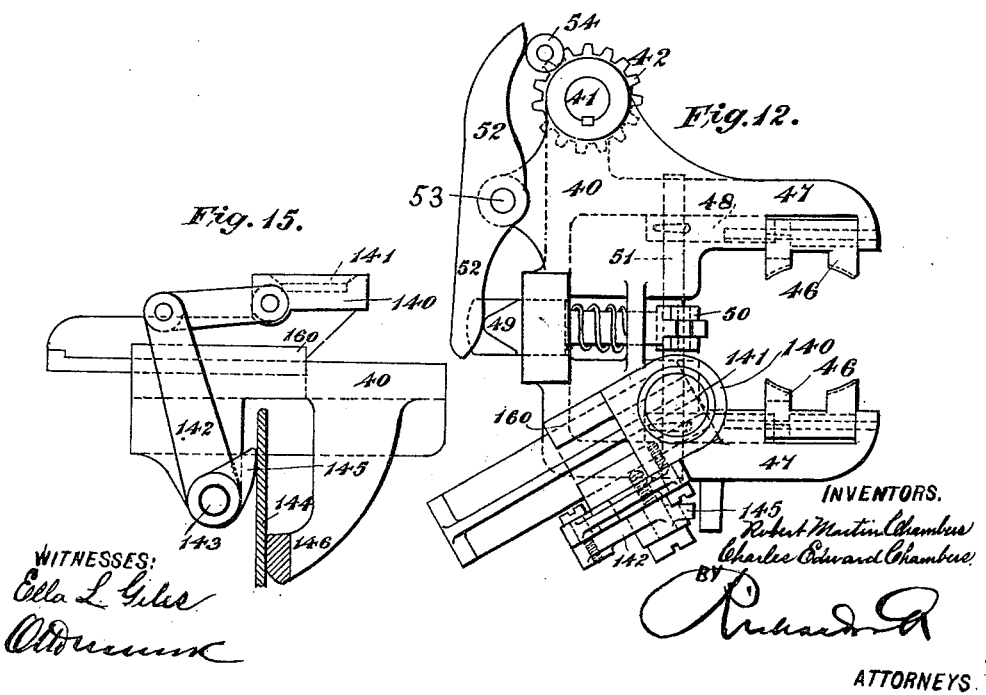
WITNESSES:
INVENTORS.
ATTORNEYS

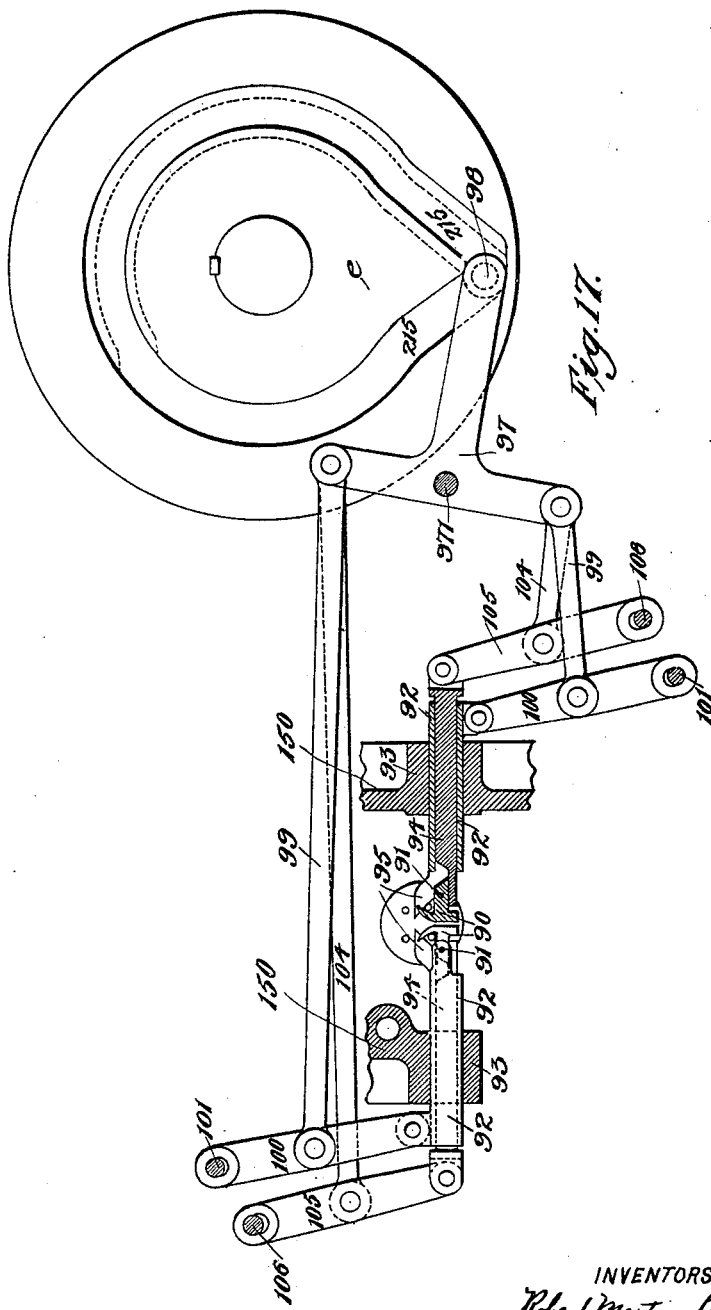

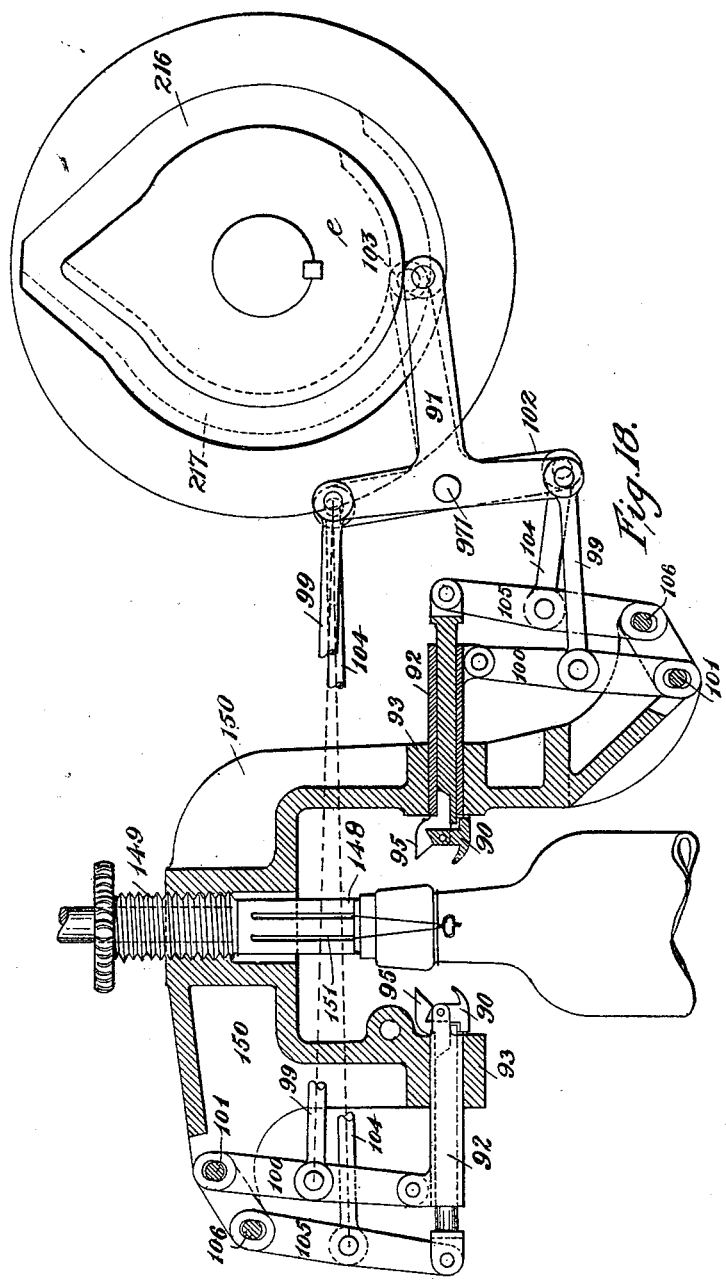

No. 632,174. Patented Aug. 29, 1899.
R. M. & C. E. CHAMBERS.
MACHINE FOR WIRING BOTTLES.
(Application filed Apr. 29, 1899.)
(No Model.) 16 Sheets—Sheet 14.
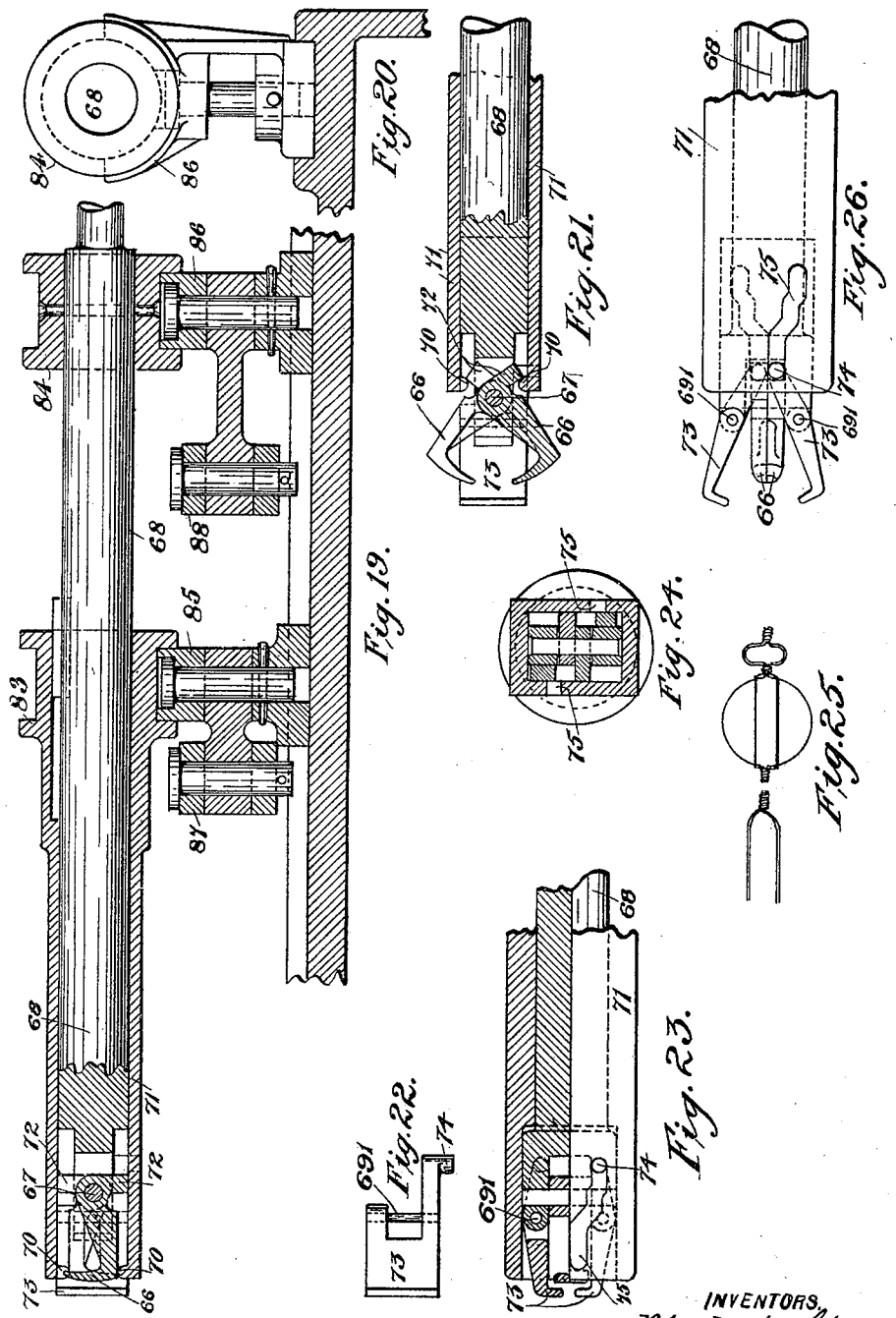
WITNESSES:
INVENTORS
Robert Martin Chambers
Charles Edward Chambers
BY
Richardson
ATTORNEYS No. 632,174. Patented Aug. 29, 1899.
R. M. & C. E. CHAMBERS.
MACHINE FOR WIRING BOTTLES.
(Application filed Apr. 29, 1899.)
(No Model.) 16 Sheets—Sheet 15.
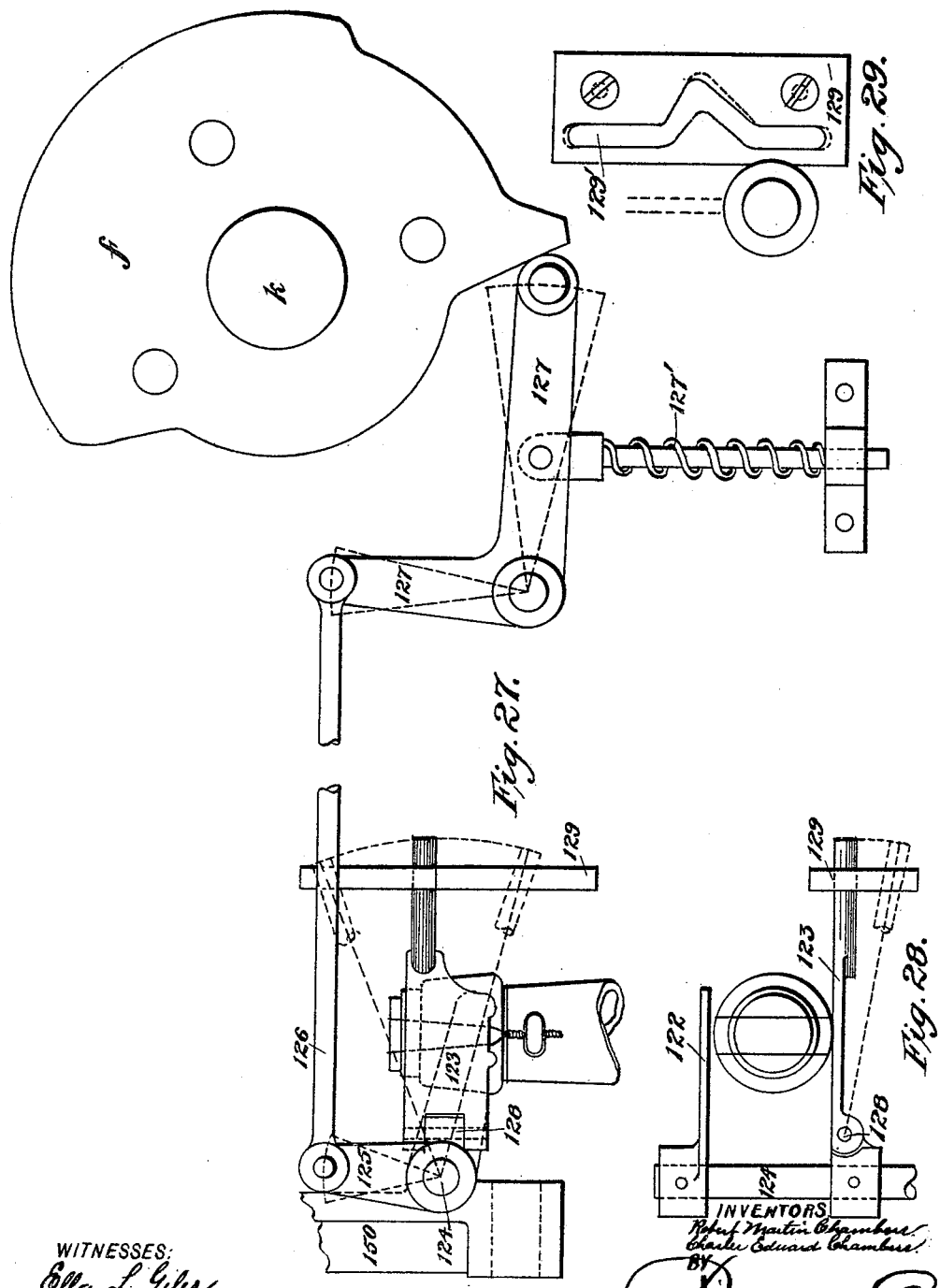

No. 632,174. Patented Aug. 29, 1899.
R. M. & C. E. CHAMBERS.
MACHINE FOR WIRING BOTTLES.
(Application filed Apr. 29, 1899.)

(No Model.) 16 Sheets—Sheet 16.

WITNESSES:
Ella L. Giles

INVENTORS.
Robert Martin Chambers
Charles Edward Chambers
BY
Richardson
ATTORNEYS

THE NORRIS PETERS CO., PHOTO-LITHO., WASHINGTON, D. C.

UNITED STATES PATENT OFFICE.

ROBERT MARTIN CHAMBERS AND CHARLES EDWARD CHAMBERS, OF BELFAST, IRELAND.

MACHINE FOR WIRING BOTTLES.

SPECIFICATION forming part of Letters Patent No. 632,174, dated August 29, 1899.

Application filed April 29, 1899. Serial No. 714,971. (No model.)

*To all whom it may concern:*

Be it known that we, ROBERT MARTIN CHAMBERS and CHARLES EDWARD CHAMBERS, engineers, subjects of the Queen of Great Britain and Ireland, residing at Cuba street, Belfast, in the county of Antrim, Ireland, have invented certain new and useful Improvements in and Relating to Machines for Wiring Bottles, (for which we have made application for Letters Patent in Great Britain, No. 13,803, dated June 21, 1898,) of which the following is a specification.

This invention relates to machines for tying the corks of mineral-water and like bottles by means of wires; and it has for its object to construct a machine, preferably driven by power, which is capable of performing the whole process of tying the cork in the bottle, including, first, the placing of a capsule of wood or other substance between the cork and the wire-tying to prevent the wire cutting into the cork; secondly, at the same time pressing the cork firmly into the bottle, thereby compressing the cork and insuring a tight tying and driving the cork back if it has come out slightly between the corking and tying operations, and, thirdly, forming a loop on the twisted end of the wire for the purpose of removing it when desired, the whole operation being performed automatically, the placing of the bottle into the holder being sufficient to start the machine, which stops automatically when that bottle is finished until the next bottle is placed or falls into the holder, when the whole operation is repeated, the machine being so constructed that the finished bottle is delivered in such a position that it does not interfere with the next bottle as it comes into the bottle-holder.

The invention consists of a machine comprising several sets of mechanism to accomplish the objects hereinbefore referred to, which sets of mechanism are hereinafter described as applied.

The machine hereinafter described is designed to use preferably four separate wires; but three or any other suitable number may be employed, if desired.

The several sets of mechanism which together constitute a machine constructed according to the invention may be classified for sake of clearness as follows: first, mechanism for manipulating the bottle; second, wiring mechanism, and, third, capsuling mechanism. The first of these sets comprises (*a*) starting mechanism operated by the weight of a bottle, (*b*) mechanism for raising the bottle to a suitable position for wiring, and (*c*) mechanism for delivering the bottle after wiring. The second set comprises (*a*) mechanism for regulating the tension of the wires, (*b*) mechanism for feeding and looping the wire, (*c*) mechanism for guiding some of the wires onto the neck of the bottle, (*d*) mechanism for twisting and cutting the wire, and (*e*) mechanism for pressing the projecting ends and loop of wire against the neck of the bottle after the wiring has been completed. The third set comprises (*a*) a container or reservoir for capsules, (*b*) a delivery mechanism, and (*c*) mechanism for placing and temporarily holding a capsule on the bottle-cork, which mechanism also serves to compress the cork in the bottle.

The invention is illustrated in the accompanying drawings, in which—

Figure 3A:
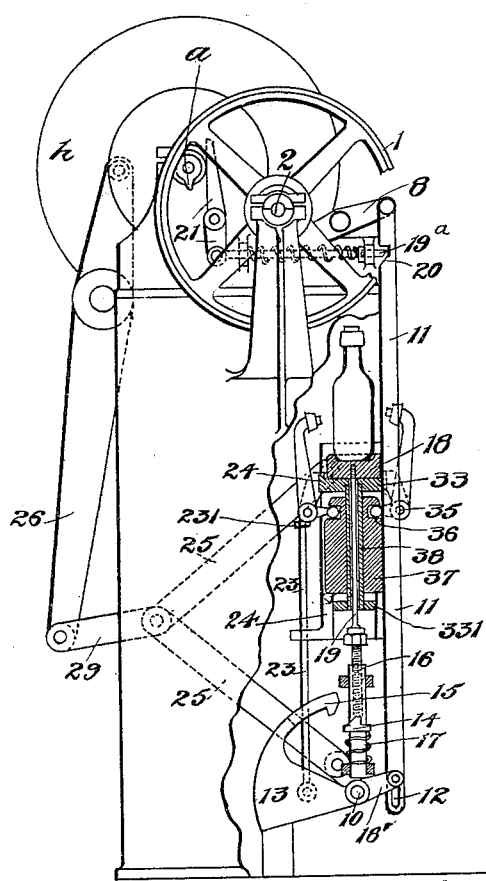
Figure 4:
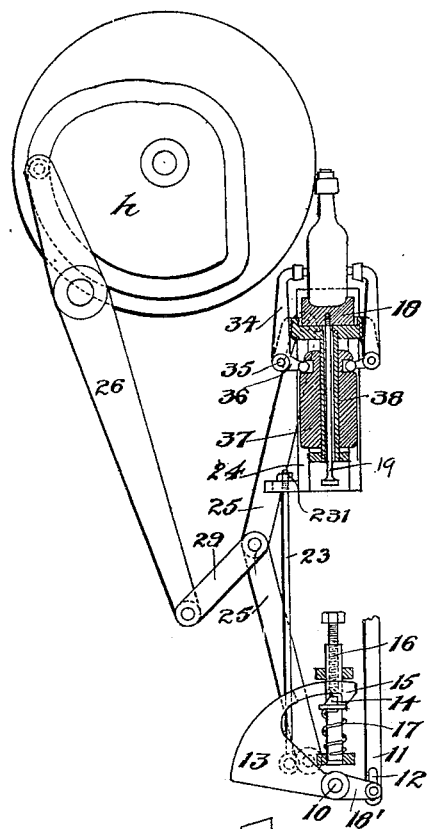
Figure 5:
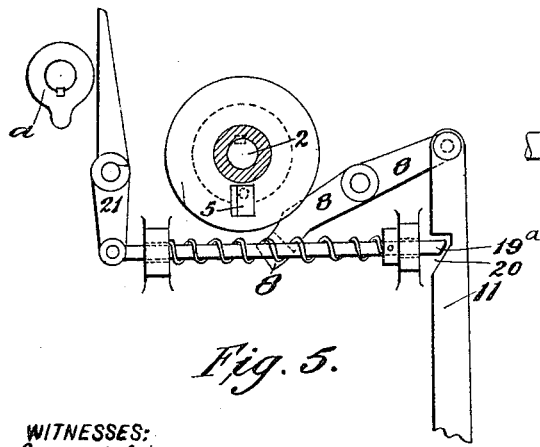
Figure 6:
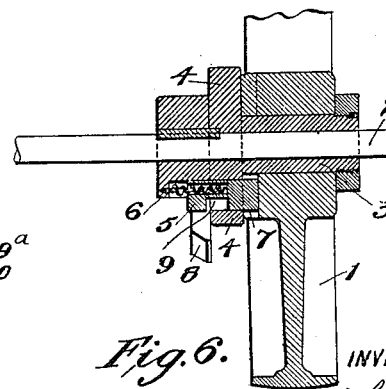
Figure 7:
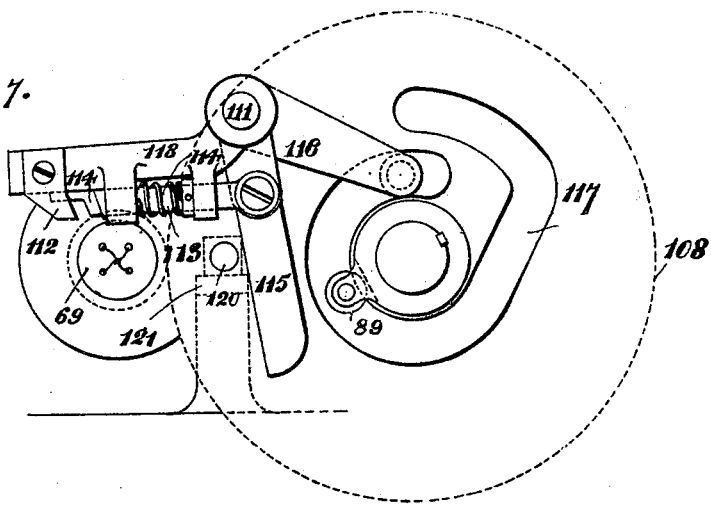
Figure 8:
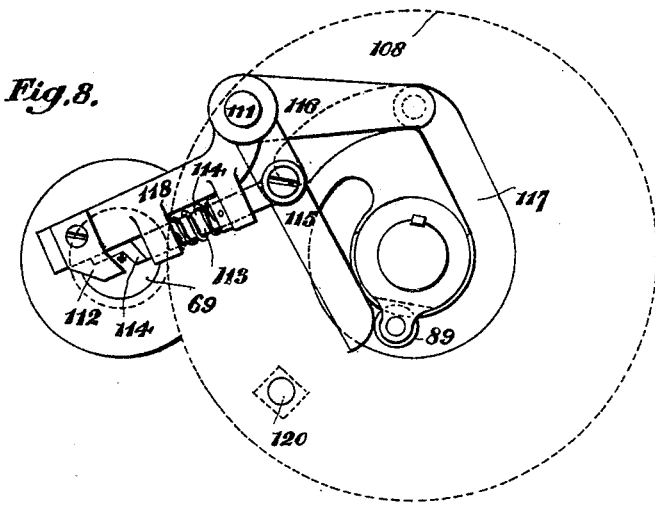
Figure 9A:
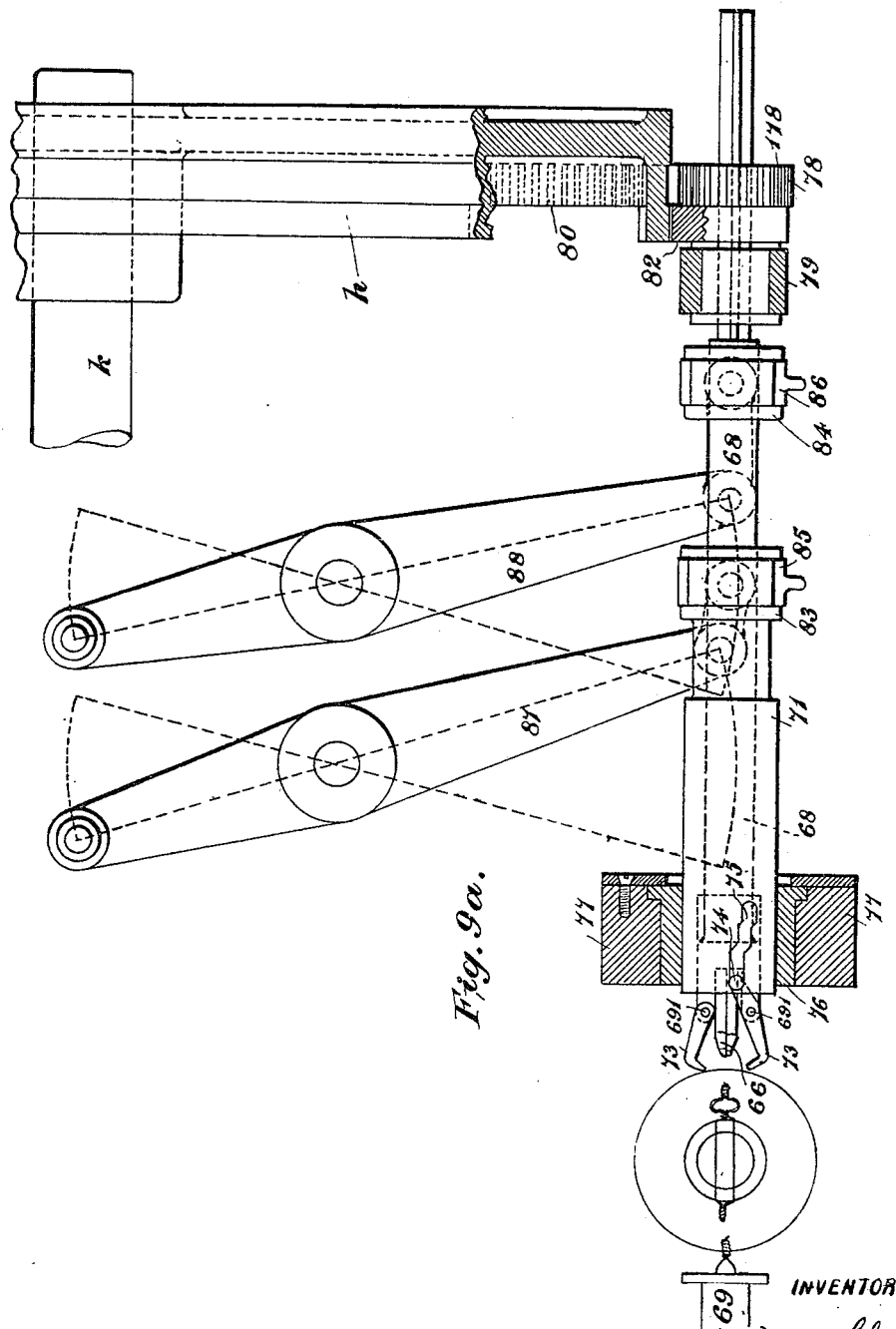
Figure 30:
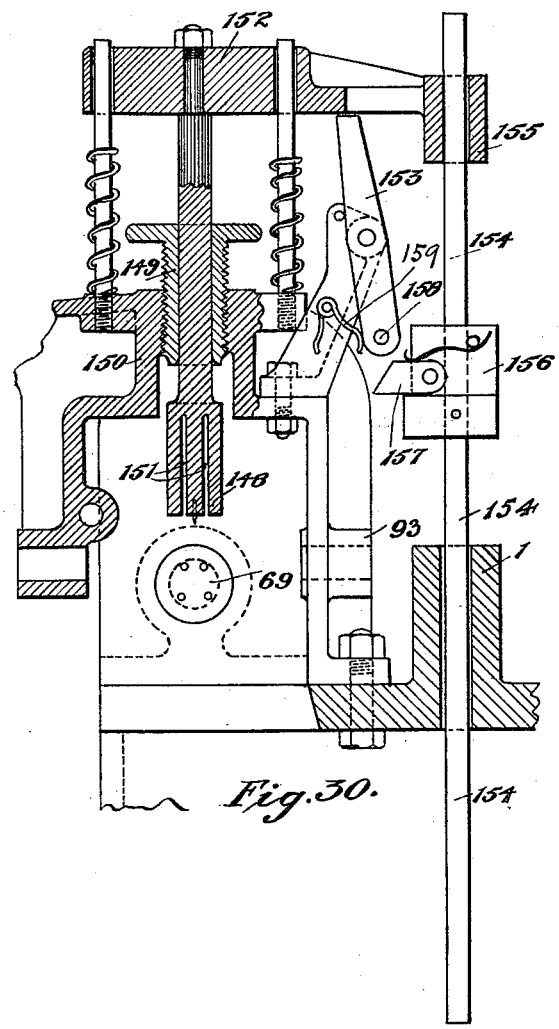
Figure 31:
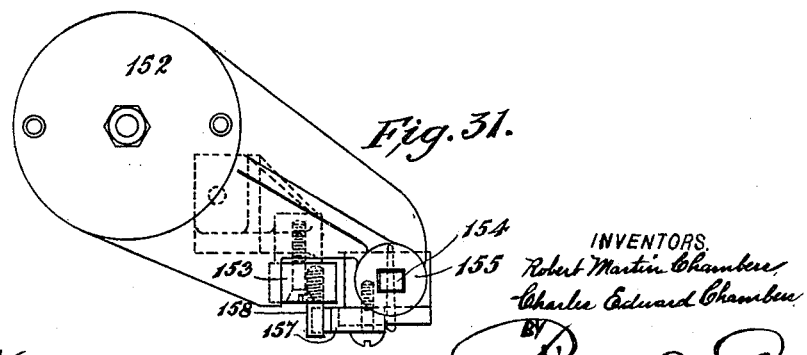

Figures 1 and 1$^a$ are part front elevations of the complete machine. Figs. 2 and 2$^a$ are part side elevations, and Fig. 3 is a plan, of the same. Figs. 3$^a$ to 35 are detail drawings of the different devices or mechanisms which together constitute the complete machine. Fig. 3$^a$ is a partial end view of the machine, illustrating the starting-gear, of which Figs. 5 and 6 show details. Fig. 4 is a view illustrating the bottle-raising gear. Figs. 7 and 8 are elevations of the wire-cutting mechanism in its inoperative and operative positions, respectively. Fig. 9 is a plan of the wire twisting and cutting mechanism in the position occupied just after a bottle has been wired. Fig. 9$^a$ is a plan of the looping mechanism. Fig. 10 is a plan of the tension-gear, bottle-delivery mechanism, and the devices employed for applying the wooden capsules. Fig. 11 is a sectional view of a detail shown in Fig. 10. Fig. 12 is a plan of the bottle-delivery mechanism and capsuling devices in the position occupied just after a bottle has been delivered. Fig. 13 is a sectional elevation corresponding to Fig. 12. Fig. 14 is a transverse sectional elevation of the bottle-delivery mechanism with a bottle in position. Figs. 15 and 16 are detail views relating to the capsuling mechanism. Fig. 17 is a sectional elevation of the mechanism employed to draw the two lower wires aside to allow the bottle-neck to pass between them, the mechanism being shown in its position ready to draw the wires aside. Fig. 18 shows the same mechanism, but in the position occupied after the wires have been released. This view also shows in sectional elevation the device employed for placing and holding the capsule on the bottle-cork. Fig. 18$^a$ is a detail plan, on the same scale, illustrating the action of the mechanism shown in Figs. 17 and 18. Figs. 19 to 26 are detail views illustrating the wire feeding and looping mechanism. Figs. 27 and 28 are respectively elevation and plan of the mechanism employed for pressing the projecting ends and loop of wire against the bottle-neck after the wiring has been completed. Fig. 29 is a detail view relating to Fig. 27. Figs. 30 and 31 are respectively sectional elevation and plan of the mechanism employed for placing a capsule on the bottle-cork. Figs. 32 to 35 are the developed plans of the several cams hereinafter referred to.

In all the figures similar parts are indicated by similar letters or figures of reference.

The machine is driven by a belt on a pulley 1, which runs loose on the driving-shaft 2 when the machine is at rest, but is arranged to be keyed to the shaft and drive the machine as soon as a bottle is placed in the machine ready to be wired.

The mechanism for starting the machine is illustrated in Figs. 1, 2, 2$^a$, 4, 5, and 6. The pulley 1 runs loosely on a sleeve 3, which is keyed to the driving-shaft 2. The sleeve 3 has a collar 4, through a hole in which a key 5 slides under the action of a spring 6 to engage with a slot 7 in the boss of the pulley 1, thereby securing the pulley to the shaft 2. The withdrawal of the key 5 causes the machine to stop, and it is accomplished by means of a wedge which is made to engage in a slot 9 in the key and force it out of engagement with the pulley. The wedge is formed on one end of a lever 8, pivoted upon the machine-frame. A link 11 is attached to the other end of the lever 8, and the weight of this link when allowed to act upon the lever is sufficient to bring the wedge into engagement with the key 5 and stop the machine. The lower extremity of the link 11 is formed with a slot 12, in which engages a pin on a short crank-arm 18', which oscillates with the same shaft 10 as a heavily-weighted lever 13. The lever 13 is normally held suspended, as shown in Fig. 4, by a latch 14 engaging with a catch 15 on the lever. The latch 14 is fixed on an adjustable bolt 16, sliding vertically against a spring 17. When a bottle is placed on a support 18, hereinafter referred to, it depresses a rod 19, attached thereto, which comes in contact with the sliding bolt 16, and thereby depresses the latch 14 and releases the weighted lever 13. The latter in falling oscillates the shaft 10 and the arm 18', raises the link 11, and thereby withdraws the wedge 8 from the key 5, which immediately engages with the pulley 1 and the machine is started. The link 11 is temporarily detained in its raised position by a catch 19$^a$ engaging in a slot 20 in the link. The catch 19$^a$ is withdrawn at the proper moment for stopping the machine by a pivoted lever 21, operated by a cam $a$. The weighted lever 13 is raised to its normal position by a rod 23 at the upper part of the upward stroke of the lifting-bracket 24. The rod 23 permits of the initial movement of the bracket 24 and is lifted by the engagement of the bracket with the nut 231 at the upper part of the upward stroke, the slot 12 allowing the lever 13 to move upward without disturbing the link. It will therefore be understood that the machine is started by a bottle being placed upon the bottle-support 18 and that as the cam $a$ is set to release the catch 19 as soon as the wiring operations are completed and the bottle is delivered the machine will automatically stop and remain at rest until another bottle is placed on the support.

To raise the bottle to the wiring position, a bracket 24 is provided, capable of sliding vertically on a column 27, the bracket being preferably raised and lowered by means of the cam $h$ acting through the lever 26 and the link 29 on the duplicate toggle-levers 25, one pair of which we preferably attach at their lower ends to the plunger and spring 30, Fig. 1$^a$, which relieves any excess of pressure on the frame should any of the bottles be slightly longer than their fellows. The upper ends of the other pair of levers 25 are pivoted to the bracket 24. Attached to the brackets 24, but capable of vertical adjustment therein to suit different lengths of bottles by means of the screw 31 is a slide 32. A lateral table 33 is provided at the upper end of the slide and a lateral ledge 331 at the lower end, while a tube 38 is fitted so as to connect them and carries within it the rod 19 of the starting mechanism, previously referred to. Brackets 35 are provided upon the table 33, which are preferably four in number and serve to carry gripping-levers 34, whose extremities 36 are acted on by the weight 37. This weight has a free vertical movement on the tube 38, and an upward movement of the weight simultaneously opens the gripping-levers 34. When the lifting-bracket 24 is lowered, a catch 39, Fig. 1$^a$, comes in contact with the weight 37, raising it relatively to the slide 32 and the table 33 and opening the gripping-levers, as shown in Figs. 1, 2, and 3$^a$. As the bottle-lifting bracket 24 rises the weight 37 is raised with it away from the stop 39, when it is carried on the ends 36 of the bell-crank gripping-levers 34, forcing them together on the bottle placed between them, as shown in Fig. 4. On the table 33 of the slide 32 is a block 18, before referred to, which is shaped to fit the bottom of a bottle. A rod 19 depends from the block 18, and when the bracket 24 is at its lowest position it comes in contact with the adjustable bolt 16, the block 18 being raised slightly above the table 33. When a bottle is placed between the gripping-levers, its weight, acting through the rod 19, presses the adjustable bolt 16 and releases the weight 13 of the starting-gear, as hereinbefore described. The cam $h$ is so formed that the bottle is lifted and lowered at the proper time. In the position of the cam indicated in Fig. 4 the slide 32 and bracket 24 have just arrived at the upward position.

The bottle when wired is removed from its support and delivered to a chute or receptacle by means of the delivery mechanism illustrated in detail in Figs. 10, 12, 13, and 14. A bracket 40 is mounted upon a spindle 41, on which is a pinion 42, deriving its motion from a rack 43, operated by suitable levers 44 441 from the cam $d$, Fig. 3. The levers 44 441 are each secured to a spindle 442, mounted in a bracket secured to the machine-frame. The cam $d$ causes the bracket to oscillate with its spindle, as indicated by the dotted line in Fig. 10. The spindle 41 is mounted within brackets 541 and 542, provided upon the machine-frame. (See Fig. 1.) Two jaws 46 are hinged on extensions 47 of the bracket 40. They are so shaped that the opening between them is a free fit for the neck of a bottle just below the collar, but not large enough to allow the collar to pass through. The jaws 46 are free to move upward on their hinges at all times, but are normally prevented from falling downward by small levers 48, Fig. 13, which are held in the horizontal position, at which they prevent the jaws from falling by means of a spring and plunger 49 acting on a small lever 50, keyed to a spindle 51, carried within the bracket 40, on which spindle the levers 48 are also keyed. The levers are depressed when the bracket 40 is brought to the position at which the bottle is delivered. This action releases the jaws 46 and allows the bottle to fall. The position at which the bottle is delivered is a little in the rear of that indicated in Fig. 10, the parts being disposed as illustrated in Fig. 12. The release of the jaws 46 is effected by a lever 52, pivoted to the bracket 40 at 53, and as the bracket 40 swings around the extended end of the lever 52 comes in contact with the pin or roller 54, provided upon the bracket 541, Figs. 2 and 3, which moves that end of the lever outward, pressing in the plunger 49, which depresses the lever 48, and thereby allows the jaws 46 to drop and deliver the bottle into a chute or receptacle, as illustrated in Figs. 12 and 13.

In Figs. 3 and 10 the bracket 40 is shown as about to move into position centrally below the capsule-lifter, hereinafter described, the pin within the cam-slot of the cam $d$ moving outwardly, as is indicated in Fig. 3. After the bottle is released the bracket 40 moves still farther out to receive a capsule, as afterward described, after which it returns into the position at which the bottle is wired, when the next bottle raised by the lifting-gear lifts the jaws 46 until the collar has passed them. As the bottle descends the jaws fall to the horizontal position shown in Fig. 14, with the collar on the bottle-neck above them, and as the bottle-lifting bracket 24, Fig. 1, still continues to descend the bottle is drawn from the holders 34 and carried around and dropped, as above described. The jaws 46 are supported by the levers 48 in such a manner that the full strain of pulling the bottle from between the levers or holders 34 does not come directly upon the end of the levers, and for the purpose we provide suitable catches 55, attached to the under side of the jaws 46. When the jaws 46 are in the horizontal position, as shown in Fig. 14, the catches press against the sides of the levers 48, thus entirely relieving them of downward pressure.

The wires used in tying the corks are fed from reels 161, situated upon some convenient part of the machine-framework, as shown in Figs. 1, 2, and 3. They pass through a device (illustrated in detail in Figs. 10 and 11) which is designed to apply a tension to the wires as the capsule-lifter descends to secure a capsule and also during the twisting operation, afterward described, and to release the wires when they are required to be fed forward. Four boxes 56 are provided, one for each wire, each box having a wedge-shaped piece 57 fitted within it, one side of the box being formed with the same angle as the wedge, the other forming a face against which the face of the wedge can grip the wire, the wedge being held in the gripping position by a spring 58 acting on a pin 59, attached to the wedge. The boxes 56 slide on the bars or guides 60, fixed in a bracket 61, attached to the frame of the machine. The boxes 56 are acted on by springs 62, which when the wire is gripped by the wedges incline to keep the wire in tension. A sliding piece 63, free to move independently of the boxes, slides on the guide-bars 60 under the action of a cam $b$, Fig. 3, through the lever 64 and is for the purpose of compressing the springs 62 and also for pressing the pin 59 against the stop 65, which compresses the springs 58 and releases the wedges 57, leaving the wires free to be drawn through the boxes, as shown. When the sliding piece 63 is moved away from the tension-boxes 56, they follow under the action of the tension-springs 62 and draw the pins 59 out of contact with the stop 65 and allow the gripping-wedges to catch the wires, which will then be put into tension by the tension-spring 62. The wires are thus allowed to travel freely through the tension-boxes or a tension put on them when desired, the cam being suitably formed to apply tension or to remove it at the proper moment. As illustrated in Figs. 3 and 32, the cam-operated lever 64 is moved laterally when the pin within the cam-slot reaches the position indicated at 202, Fig. 33, and thereby tension is put upon the wires while the capsule-lifter descends to secure a capsule. The cam-operated lever then returns, and the pin within the cam-slot reaches the position indicated at 201, and the tension is thereby released. The cam-operated lever again moves forward by the diversion of the slot at 200 and the tension is again immediately put upon the wires while the twisting movement is effected. The cam-operating lever then again returns and releases the tension.

The mechanism illustrated in Figs. 9ª and 19 to 26 is for the purpose of catching the wire and drawing it across the portion of the machine which is occupied by the bottle-neck when it is being tied and also for forming a loop on the tying to facilitate the removal of the wire when desired. Referring to Fig. 9ª, which shows the mechanism in the position occupied on the completion of a tying operation, a pair of pointed hooks 66 are pivoted at 67 to a spindle 68 and are so formed that they are inserted behind the twisted end of the wire at the spindle 69, hereinafter described, when acted on by the catches 70, Figs. 19 to 26. The catches press against the block of the hooks and close them when the sleeve 71, to which they are attached, is moved forward, and they catch against the small piece 72 on the hooks 66 and force them open when the sleeve 71 is drawn back. In addition to these hooks we provide two jaws 73 73, each pivoted to the spindle 68 at the points 691 and at right angles to the hooks 66, the other ends of each of the jaws being extended past the pivots 691 and terminating in pins 74, which engage in respective cam-slots 75 in the sleeve 71. These jaws gather the wire around the looping-hooks, holding them at the correct distance apart and maintaining them closely together before twisting, thus assisting in securing a good tie. The spindle 68 and sleeve 71 revolve together, the sleeve 71 passing through a bush 76, capable of revolving in the bearing 77, mounted within the bracket 150. A pinion 78 is fitted in a bearing 79, which allows it to revolve when acted on by the segment 80, (shown dotted in Fig. 9ª,) but prevents any lateral motion. This bearing is supported within a bracket 791, by which the spindle 68 is carried. The spindle 68 passes freely through the pinion 78 and is attached to it by means of a feather, thus allowing of the endwise motion of the spindle 68 within the pinion, the spindle revolving with the pinion when geared by the segment 80, attached to the cam $h$. On the boss of the pinion 78 is formed a concave piece 82, which when the pinion is not in motion fits against the rim of the cam $h$ and locks the pinion in a certain fixed position, so that when the spindle is at rest the opening movement of the hooks is vertical and that of the jaws horizontal. A portion of the rim of the cam $h$ is cut away opposite to the segment 80, allowing the pinion to be turned by the same segment, the rim again engaging the concave piece 82 and locking the pinion as soon as the required number of twists have been given the wires. To give the looping-hooks 66, with their attached spindle, and also the sleeve 71, with its cam-slots 75 and catches 70, the necessary lateral motion, grooved collars 83 and 84 are provided attached, respectively, to the sleeve 71 and spindle 68. These collars are engaged by suitable forks 85 86, respectively, in which they are free to revolve. The fork 85 is connected by a suitable link to the lever 87 and the fork 86 to the lever 88, which levers receive motion from the cam $g$, (see Figs. 1 and 35,) the cam being so formed that the sleeve and spindle are moved forward with the hooks and jaws open, as shown in Fig. 9ª, until the hooks 66 reach the spindle 69. This movement corresponds with the movement of the cam-rollers in the part of the slots indicated 205 and 206, respectively, Fig. 35. The sleeve is then moved slightly forward relatively to the spindle corresponding to the greater length of the part of the slot 205 over that of the part 206 of the cam $g$, so that thereby the hooks 66 are forced behind the twisted portion of the wire. The cam then moves the levers and draws the spindle 68 and sleeve 71, with their attached hooks and jaws and wire, across the gap of the machine, where the bottle is wired, this movement corresponding to the movement of the cam-roller in the parts 203 and 204 of the slots in the cam. The part of cam-slot 204 being longer than 203 draws the spindle 68 still farther out of the sleeve 71. This movement of the spindle relatively to the sleeve partly closes the jaws 73 to bring the top wires to the position which allows the capsule-lifter (afterward described) to fall freely. After the bottom wires have been drawn aside by the side hooks (afterward explained) and the bottle raised to wiring position the sleeve 71 moves still farther outward on the spindle 68 and entirely closes the jaws 73. This movement corresponds with the movement of the cam-roller in the part 214 of the cam-slot. The sleeve and spindle then advance slightly toward the bottle-neck, this movement being caused by the parts 212 and 213 of the cam-slots. The segment 80 then gears with the pinion 78 and revolves the spindle 68 with the sleeve 71 and the attached hooks and jaws, the wire being twisted between the hooks 66 and the neck of the bottle and a loop formed around the hooks 66. This twisting movement corresponds in time to the movement of the cam-rollers within the respective parts 210 211 of the cam-slots. The sleeve then draws back. This movement, which corresponds with the part 209 of the cam-slot, opens the hooks and side jaws to their full extent in order to release the loop. The sleeve 71 and spindle 68 then draw back in order to allow the loop room for bending down. This movement corresponds with 207 and 208 of the cam-slots, when the suitable levers, hereinafter described, bend down the loop and the twisted end of the wire attached to the bottle, which has been twisted by the twisting-spindle and cut off by the cutting-jaws (hereinafter described) while the loop was being formed. The bottle is then removed and the hooks travel across again and repeat the operation above described.

Before the bottle starts to rise up to its wiring position the two lower wires are drawn aside to allow the collar on the neck of the bottle to pass between them, and they are afterward released, so as to lie closely against the bottle-neck, just beneath the collar. The mechanism employed to perform this function is shown in detail in Figs. 17 and 18 of the drawings. Two hooks 90 are pivoted at the points 91 to the sliding tubes 92, which are capable of sliding in the bearings 93 within the bracket 150. Within the tubes and capable of sliding endwise therein are locking-bars 94, which are so formed that they are each capable of being pushed under the flat surface in the lower side of the hooks 90 and turning them on their pivots 91 till they assume the hooked position shown in Fig. 17, the locking-bars 94 passing far enough under the hooks 90 and past the pivots 91 to support them beyond the pivots and lock them, so that the pull of the wires will not force the hooks around on their pivots, which would release the wires. A pointed portion 95 is attached to each tube 92 for the purpose of separating the top wires from the bottom ones, when both hooks are pushed forward, as shown in Fig. 17, and to prevent the top wires being caught by the hooks 90. The hooks 90 when closing pass the sides of the points 95, and each bottom wire is inclosed between the hook and the point, so that they are completely engaged, and they cannot slip from the hooks 90 until the locking-bars 94 are drawn back and the hooks are released, the points 95 serving the double purpose of separating the bottom wires from the top and retaining the former on the hooks. For the purpose of moving and opening and closing these hooks we preferably provide a cam $e$, having two grooves, one of which is shown in full in Figs. 17 and 18, the other being dotted. The groove which is shown in full acts on a T-shaped lever 97, pivoted upon a pin 97¹ through the roller 98, attached to the longer arm of said lever, the shorter arms being connected by links 99 with levers 100, which are pivoted at the points 101 to the frame of the machine, their other ends being pivoted, respectively, to each of the sliding tubes 92. The links 99 are connected at a point about the center of the levers 100, as shown in Figs. 17 and 18. The groove which is shown dotted acts on the second T-shaped lever 102 (seen in Fig. 18) through a roller 103. It is connected, through the links 104, to levers 105, pivoted to the frame of the machine at the points 106, their other ends being attached to the locking-bars 94. The links 104 are connected to the levers 105 at a point about the center of said levers.

As the cam $e$ is revolved the levers 97 and 100, with their respective links 99, reciprocate the sliding tube 92, with the hooks 90 attached thereto, and the other levers 102 and 105 and links 104 reciprocate the locking-bars 94. The respective movements are so arranged that the wires are caught by the hooks 90 and released at the time required, the bars 94 being moved inwardly relatively to the tubes 92 and the hooks being thereby turned upward to hook the wires, as seen in Fig. 17, and the bars 94 being drawn out relatively to the tubes 92 when the wires are released, as seen in Fig. 18. The necessary inward movement of the rods 94 and tubes 92 is effected by the shaping of the cam-slot in a V shape at the part 215, while the closure of the hooks 90 on that inward movement is effected by arranging one part 216 of one of the cam-slots to be coincident with the other, while the other respective parts 217 are not so. The rods 92 accordingly advance as the cam-rollers pass into those parts of the slots that are coincident, and thereby the closure of the hooks is effected.

The mechanism employed for twisting and cutting the wire is illustrated in detail in Figs. 7, 8, and 9 of the drawings. The wires are led from the tension-gear before described through a hollow spindle 69, drilled with four holes in its solid end, one for each wire. A pinion 107, mounted upon the spindle, gears with a spur-wheel 108, running loosely on the main driving-shaft of the machine. The wheel is driven at the desired moment by a clutch 109, connected to the driving-shaft by a feather-key and operated by a lever 110 from a cam $c$. When it is desired to twist the wire, the lever 110 throws the clutch 109 into engagement with the wheel 108, which then turns with the driving-shaft and revolves the pinion 107 and the spindle 69 four or five times, giving the necessary twist to the portion of the wire between the end of the spindle 69 and the neck of the bottle. To cut off this wire after it has been twisted, the cutting arrangement is provided, as shown in Figs. 7, 8, and 9 of the accompanying drawings. The cutter when out of action occupies the position shown in Fig. 7 and consists of an arm 118, fixed to a spindle 111 and having at its end the fixed cutting-jaw 112. Sliding in the arm 118 is a sliding bar 113, at the end of which is a cutter 114, which passes the fixed cutting-jaw 112 and shears the wire between them. The sliding bar 113 is held back by a spring 114, so that the cutters are normally open, the bar 113 being connected to a lever 115, free to move on the spindle 111 independently of the arm 118. A lever 116 is rigidly attached to the spindle 111, to which the arm 118 is keyed, and its end is guided by the cam 117 in the wheel 108, said cam moving the arm 118 downward, with the spindle 111 as a center, until the cutters 112 and 114 come one on each side of the wires, as shown in Fig. 8, just as they have been twisted together by the revolving of the wheel 108. When the arm 118 has been brought to the position shown in Fig. 8, the shaft still revolves till the cam 89 comes in contact with the lever 115, forcing it forward and moving the cutting-jaw 114 past the fixed jaw 112 and shearing the wire between them at about the center of the twisted portion, (see Fig. 9,) one part tying the bottle, the other part remaining attached to the spindle to form part of the loop on the next bottle. At this point the cam c moves the lever 110, drawing back the clutch 109, as shown in Fig. 9, and releasing the wheel 108, when a coil-spring 119 on the twisting-spindle 69, which was wound up when the wire was twisted, comes into action and turns the wheel 108 in the reverse direction into its normal position, when the catch 120 strikes the stop 121, as shown dotted in Fig. 7. The wheel 108 when thus returning moves the arm 118 from the position shown in Fig. 8 to that shown in Fig. 7, leaving the end of the wire which extends beyond the spindle 69 free to be seized by the looping-hooks, as hereinbefore described.

The mechanism shown in Figs. 27 to 29 is designed for bending down the loop and the twisted end of the wire against the bottle-neck after the loop has been formed by the looping-hooks, Fig. 25, and the wires for tying severed from that in the spindle, as hereinbefore described. Two levers 122 123 are keyed to a spindle 124, mounted within the bracket 150, to which spindle is keyed the lever 125, connected by the rod 126 to the lever 127, which receives its motion from the cam $f$ on the shaft $k$. The lever 123 is hinged at 128, and its point is guided by the slot 129' in the cam-plate 129. When the side hooks 90, before described with reference to Figs. 17 and 18, have drawn aside the two bottom wires, the cam, acting through the levers 127 and 125 and the connecting-rod 126, presses the levers 122 123 firmly down on the top of the wires, which are thereby forced in against the neck of the bottle as the bottle rises to be wired, thus helping to secure a good tie. To further secure the same object, the levers are slightly lifted before the twist is finished, which allows the twist to come closer against the bottle-neck. Just after the wire is cut off by the cutting-off jaws and the loop has been released from the looping-hooks hereinbefore described the levers 122 123 are brought fully down, the lever 123 on the loop side of the bottle moving in the slot in the cam-plate 129, which just imparts to it an outward motion to prevent its injuring the loop, and afterward an inner motion against the neck of the bottle, which folds the loop against the bottle-neck. The levers are then raised by the cam $f$ and the connections above described, so that they are clear of the looping-hooks until they are again required. To maintain the cam-roller of the cam-operated lever 127 in contact with the cam $f$, a spiral spring 127' is employed, which surrounds a rod connected to one arm of the lever 127.

In order that the cork shall not be cut by the wires, a small wooden capsule or protector is placed in the cork under the wires previous to the tying operation. A supply of capsules is carried by a rotary reservoir, and the capsules are automatically applied one by one to the bottles by the mechanism hereinafter described with special reference to Figs. 10, 12, 14, 16, 30, and 31. A sufficient number of capsules to allow the machine to run a considerable period without attention is contained within tubes or containers 130, mounted on a revolving perforated disk 131. The disk is so centered on a pin 132, carried by a bracket 133, that the chambers 130 can be brought successively over the opening 134 by means of a ratchet-pawl 135, acting on ratchet-teeth 136 around the rim of the disk, the pawl being moved by any suitable reciprocating part of the machine, preferably the tension-gear before described, as shown in Fig. 10. The pawl 135 is moved on the working stroke by a spring 137 and only receives a definite movement from the tension-gear when moving in the direction in which the pawl does not engage. On the edge of the opening 134, on the side toward which the disk 131 moves, is a small stop or catch 138, Figs. 10 to 16, a groove 139 (shown dotted in Fig. 10 and in section in Fig. 16) being cut around the disk 131 on the under side, so that when the chambers 130 are empty the disk 131 is free to revolve, the bracket 133 forming a bottom for each of the chambers except the one over the opening 134. If there are capsules in any of the chambers, the catch will engage them and prevent the disk turning farther until all the capsules in that chamber have fallen into the opening 134, when the disk will be again free to revolve under the action of the pawl and spring 137 until a capsule in another chamber comes in contact with the catch. In this way the disk 131, with its chambers, will continue to supply the capsules automatically till its store is exhausted, the pressure on the capsule against the stop 138 caused by the spring 137 being relieved once during each revolution of the machine, (see Fig. 10,) allowing the capsules to fall from the chamber into the opening 134. The capsules from the containers above described descend through the opening 134 into a capsule-carrier 140, attached, preferably, to the oscillating bracket 40, before referred to, said capsule-carrier having a pan 141, in which the capsule is carried. The capsule-carrier has a motion on guides 160, attached to the brackets 40, approximately tangential to a circle drawn with the center of the spindle 41 as a center, the movement of the capsule-carrier moving the pan 141 from the position over the center of the opening for receiving the bottle-neck in the jaws 46 (shown in Fig. 10) to a position quite clear of the opening in the bracket 40, through which the bottle passes, as shown in Fig. 12, to allow the pan to clear the jaws and bottle as it rises to be wired. To draw the capsule-carrier backward as the bottle rises, we provide a bell-crank lever 142, which is pivoted to the bracket 40 at the point 143, Fig. 15. A sword-shaped piece 144 is attached to the bottle-lifting bracket 24 before described, which as that bracket rises presses the arm 145 of the bell-crank lever 142 and draws back the capsule-carrier to the position shown in Fig. 12, the sword-shaped piece 144 passing between the end of the lever 145 and a bracket 146, attached to the delivery-bracket 40, which holds the bracket 40 firmly in position while the carrier 140 is being moved. The capsules pass to the capsule-carrier through the opening 134, Figs. 10 and 16, in which a few capsules can lie, said opening being closed on the under side by a sliding door 147. (Shown dotted closed in Fig. 10 and in section open in Fig. 16.) The door is pushed open by the capsule-pan 141 after it has brought the capsule-carrier back to the position shown in Fig. 16, said pan then forming the door which closes the bottom of the opening 134. The circular hollow cut in the pan 141 is capable of holding one capsule on its flat face, and the edges of the hollow part are chamfered off, so that if a second capsule comes partly out of the opening 134, as seen in Fig. 16, it is forced back by the chamfer on the edge of the hollow pan 41 as the bracket 40 moves toward the center of the machine, where the bottle is wired. To lift the capsule from the pan 141 and hold it in readiness under the wires of the rising bottle and also for the purpose of compressing the cork in the bottle-neck, the device shown in Figs. 30 and 31 is provided. A plunger 148, hereinafter referred to as the "capsule-lifter," slides vertically in the screwed bush 149, the bush being threaded into the bracket 150 for the purpose of regulating the amount that the capsule-lifter can rise with the bottle as it rises to wiring position. In the capsule-lifter 148 are two slots 151, which are deep enough to allow the capsule-lifter to pass through the two top wires and to secure the capsule from the pan 141, Figs. 10, 14, 15, and 16, on the needle-points in its face. On the capsule-lifter is a weight 152, with which engages a latch 153 and holds it with the capsule-lifter suspended when the latter is raised by the bottle. A rod 154 has a free vertical movement in the guide 155, attached to the weight 152, and is acted on by the bottle-lifting bracket, before referred to, through part of its stroke. Attached to the rod 154 is a collar 156, on which a catch 157 is hinged in such a way that it engages with the pin 158 on the latch 153 on the upward movement of the rod 154, but passes the pin without engaging it on its downward movement. The collar 156, coming in contact with the guide on the weight 152, also serves to lift the capsule-lifter 148 and prevent it fouling the looping-hooks before described if by accident the machine should be started without a bottle being in the bottle-lifting bracket. As the bottle-lifting bracket with the bottle rises to be wired the capsule is carried in on the pan 141, when the lifting-bracket raises the rod 154 and brings the catch 157 into contact with the pin 158 on the latch 153, and thus releases the weight 152 and the capsule-lifter 148, which falls, the slots 151 allowing the capsule-lifter to pass through the two top wires and secure the capsule on pins in its face. The bottle-lifting bracket still rising, the sword-shaped piece 144, Fig. 15, comes in contact with the arm 145 of the bell-crank lever 142, drawing back the capsule-carrier 140. The bottle then continues to rise until the collar on the capsule-lifter 148 comes in contact with the bush 149, which compresses the cork. The latch 153 under the action of the spring 159 then catches the weight 152 and suspends it in readiness for the next bottle. As the bottle descends the collar on the neck is caught by the trap-jaws 46, before referred to, and drawn out of the holders 34, Fig. 4, and carried by the bracket 40 and dropped into a chute, as before described. The delivering-bracket 40 travels farther back until the pan 141 comes in contact with the door 147, when the capsule-pan is first moved back to the central position in the bracket 40 and then opens the door 147 and secures another capsule in the pan for the next bottle to be wired.

Each separate part of the machine having been described in detail, the general operation of the complete machine may be described as follows: It is assumed that the machine is at rest and that a bottle has just been wired and delivered. The machine will then be ready to receive another bottle, and several of the mechanisms will have already performed their functions—namely, the looping-hooks will have secured the wire and drawn it across the gap of the machine, the side hooks 90 (hereinbefore described with reference to Figs. 17 and 18) will have drawn aside the two lower wires, and the capsule-holder 140 will have already received a capsule from one of the containers 130, as hereinbefore described with reference to Figs. 10 and 16, and the bracket 40 will have started to move in and will occupy the position shown in Fig. 3. Another bottle is now placed upon the support 18 and by its weight, acting through the rod 19 and bolt 16, releases the weight 13, which, through the rod 11 and lever 8, allows the pulley 1 to be keyed to the main or driving shaft 2, and the machine is started, all in the manner as hereinbefore described in detail, with reference to Figs. 3ª, 4, 5, and 6. As soon as the machine is started motion is transmitted from the driving-shaft 2 to the cam-shaft $k$ by the pinion $i$ and wheel $j$, and the different mechanisms are set in motion in their proper order, as hereinafter described. The first to be effected is the bottle-lifting gear, the cam $h$ acting, through the lever 26 and toggle-levers 25, to raise the lifting-bracket 24. As this bracket rises the weight 37 bears upon the ends 36 of the levers 34, which latter are thereby caused to grip the bottle and hold it centrally upon the support 18, as before described with reference to Figs. 3ᵃ and 4. The tension-gear is then actuated by the cam $b$ through the lever 64, and a tension is applied to the wires, as before described with reference to Figs. 10 and 11. The bracket 40 next moves into its inmost position, (indicated by $x$, Fig. 10,) carrying the capsule-carrier 140 with it, so that the capsule-pan 141 is centrally under the capsule-lifter 148, which is released and falls onto the capsule, the top wires passing in the slots 151. The weight 152 causes the lifter 148 on falling to secure the capsule on a pin or pins on its face. When the lifter secures the capsule, it raises it just clear of the pan 141, all as before described with reference to Figs. 30 and 31. Then the sword-shaped piece 144 on the bottle-lifting bracket, which latter has been rising during the above operations, comes in contact with the arm 145 of the lever 142, and the pan 141 is drawn back, as before described with reference to Figs. 10, 12, and 15. The bottle then continues to rise and its neck passes between the lower wires when the tension on the wires is relieved. The bottle rises still further until it reaches the capsule, when it raises the capsule-lifter, together with its weight, until a shoulder on the former engages with the bush 149, Fig. 30, and a slight further movement of the bottle compresses the cork. At this instant the cam $e$ causes the side hooks 90, (as before described with reference to Figs. 17 and 18,) to release the lower wires when a tension is applied to the wires, as described with reference to Fig. 10, which causes the lower wires to spring tightly against the bottle-neck just below the collar. Then the cam $c$, through the lever 110, throws the clutch 109 into connection with the wheel 108, which latter drives the pinion 107 and causes the twisting-spindle 69, Fig. 9, to rotate and begin twisting the wires. The segment 80 then comes into gear with the pinion 78 and rotates the looping-spindle 68 and the twist on the loop is started, as before described with reference to Figs. 9ᵃ and 19 to 26. As soon as the loop is finished the looping-hooks 66 release the wire, when the cam-slot 117 in the face of the wheel 108, as already described with reference to Figs. 7, 8, and 9, operates the lever 116 and brings the cutter 114 down onto the wires and the cam 89 comes in contact with the lever 115 and the wire is cut. The spring 119 then revolves the spindle 69 in a reverse direction, removing any twist in the wire between the spindle and tension-gear and at the same time revolving the wheel 108 backwardly, so as to remove the wire-cutter away into its normal position, the cam $c$, through the lever 110, having by this time released the wheel from the clutch 109. When the wire is cut, the cam $f$ operates the bending-down levers 122 123 through the bell-crank 127, which levers are depressed on each side of the bottle-neck and press the ends of the wire and the loop firmly against the neck, as described with reference to Figs. 27, 28, and 29. The wiring of the bottle having been completed the tension on the wire is again relieved and the bottle and lifting-bracket begin to lower, leaving the weight 152 of the capsule-lifter suspended upon its catch 153, Fig. 30. The collar of the bottle on lowering is then caught by the jaws 46, and the cam $d$ oscillates the bracket 40 by means of the lever 44 and pinion 43. The bracket 40 carries the bottle suspended in the jaws 46 away from the bottle-holder into a suitable position over a chute, when the roller 54 comes in contact with the lever 52, which depresses the plunger 49, withdraws the levers or catches 48 from under the jaws 46, and allows the latter to drop and release the bottle, all as before described with reference to Figs. 10, 12, 13, and 14. By this time the bottle-lifting bracket 24 will have arrived at its lowest position. Just as the bottle is caught in the jaws 46, as above described, the cam $g$ starts to move the levers 87 88, which cause the looping-hooks 66 to start, moving across the wiring-space to grip the wire ready for another bottle. They advance until the hooks engage behind the twisted end of the wire, (as already described with reference to Fig. 9,) when the jaws 73 (also described) grip the wire, and the looping-spindle then moves backward and draws the wires with it. The cam $e$ next begins to operate the side hooks 90, which move inward and secure the bottom wires, (as described with reference to Figs. 17 and 18.) Just at this instant, also, the bracket 40 will have reached the limit of its oscillatory motion and the capsule-pan 141 will have come under the capsule-holder 131 and received a capsule from the container 130, which is over the opening 134, (as before described with reference to Figs. 10 and 16.) As soon as this happens the side hooks 90 recede and draw aside the lower wires and the bracket 40 starts on its inward movement, bringing the capsule-carrier 140 with a capsule in its pan 141; but before it finishes its inward movement the cam $a$ engages with the lever 21, Fig. 3ᵃ, and withdraws the catch 19 from the notch 20 in the lever 11. The latter then falls under its own weight and causes the lever 8 to withdraw the key 5 from the boss of the driving-pulley 1 and the machine is stopped, all as before described with reference to Figs. 3ᵃ, 4, 5, and 6. The machine will then remain at rest until another bottle is placed on the support 18, when the whole operation above described will be repeated.

Having now described our invention, what we claim as new, and desire to secure by Letters Patent, is—

1. In a bottle-wiring machine, the combination with the bottle-wiring means, of a holder for the bottle, means for driving said wiring means, means automatically operated by the placing of the bottle in the holder for connecting said driving and wiring means, and means for automatically disconnecting said driving and wiring means on the completion of the wiring of one bottle, substantially as described.

2. In combination, the bottle-wiring means, driving means therefor, a clutch serving to connect and disconnect said driving and wiring means, a depressible holder adapted to be depressed by the weight of the bottle, and connections operated by the depression of said holder for automatically operating the clutch, substantially as described.

3. In combination, the bottle-wiring means, driving means therefor, a clutch serving to connect and disconnect said driving and wiring means, a depressible holder for the bottle to be wired, a weighted lever held normally elevated and released by the depression of the holder, and connections between said weighted lever and clutch whereby the depression of the lever operates the clutch, substantially as described.

4. In bottle-wiring machines, means for lifting the bottle-bracket consisting of a cam and toggle-joint and connections, substantially as hereinbefore described and illustrated.

5. In bottle-wiring machines, means for holding the bottle in position upon its support consisting of arms which are held to grip the bottle by means of a weight centrally disposed, in combination with means for lifting the bottle-bracket, substantially as hereinbefore described and illustrated.

6. In bottle-wiring machines, means for the delivery of a bottle after tying, consisting of an oscillating bracket in which bottle-supporting jaws are mounted, so as to be capable of allowing the upward passage of the bottle-neck, but which grip it as it descends, substantially as described.

7. In bottle-wiring machines, means for the delivery of a bottle after tying consisting of an oscillating bracket in which bottle-supporting jaws are mounted, so as to be capable of allowing the upward passage of the bottle-neck, but which grip it as it descends, and means for releasing the gripping-jaws, substantially as hereinbefore described.

8. In means for the delivery of a bottle after tying, in bottle-wiring machines, means for releasing the bottle-supporting jaws consisting of levers which are depressed by means of a lever operated by a stop upon the oscillation of the bottle-supporting bracket, substantially as described.

9. In bottle-wiring machines, means for exercising tension upon the tying-wires employed consisting of a number of boxes corresponding to the number of wires employed having within them wedge-shaped pieces which grip the wire against the side of the box, the boxes being under the action of springs tending to maintain the wires gripped, such boxes being moved rearwardly when required against the action of their springs on operation by gear thereby releasing the tension on the wires, substantially as described.

10. In bottle-wiring machines, means for exercising tension upon the tying-wires employed consisting of a number of boxes corresponding to the number of wires employed having within them wedge-shaped pieces acted upon by springs, such pieces gripping the wire against the side of the box, while the boxes are under the action of springs tending to maintain the wires gripped in tension, such boxes being moved rearwardly when required, against the action of their springs in operation by gear, thereby releasing the tension on the wires, substantially as described.

11. In a bottle-wiring machine, the combination with the twisting-spindle with means for rotating the same, of a rotary and longitudinally-movable spindle arranged to move toward and from said twisting-spindle, hooks carried by said spindle designed to engage behind the twisted end of the wires projecting from said twisting-spindle, jaws pivoted at right angles to said hooks for gathering the wires around the hooks, and means for operating said jaws and hooks, substantially as described.

12. In combination, the twisting-spindle with means for rotating it, a rotary and longitudinally-movable spindle arranged to move toward and from the twisting-spindle, means for rotating said spindle and advancing and retracting it when desired, hooks pivoted to said spindle for engaging the wires, gathering-jaws pivoted to said spindle at right angles to said hooks, and means for operating said hooks and jaws comprising a rotatable and longitudinally-movable sleeve encircling the spindle and having operating engagement with the said jaws and hooks, and means for reciprocating said sleeve, substantially as described.

13. In bottle-wiring machines in which three or more tying-wires are employed and in which the neck of the bottle passes between two of the wires, means for drawing these latter wires apart consisting of side hooks which are caused to engage the wire upon the operation of a bar, the bar afterward receding and releasing the wires, substantially as hereinbefore described.

14. In bottle-wiring machines in which three or more tying-wires are employed and in which the neck of the bottle passes between two of the wires, means for drawing these latter wires apart consisting of side hooks attached to the extremity of tubes within which bars slide and are capable of causing the hooks to engage or release the wire, substantially as described.

15. In bottle-wiring machines in which three or more tying-wires are employed and in which the neck of the bottle passes between two of the wires, means for drawing these latter wires apart and separating them from the other wires consisting of side hooks which are caused to engage the wire and projections upon the parts by which they are carried which with the hooks serve to completely inclose the wires for the neck, substantially as described.

16. In bottle-wiring machines in which three or more tying-wires are employed and in which the neck of the bottle passes between two of the wires, in combination means for engaging the latter wires and draw them apart consisting of side hooks attached to the extremity of tubes within which bars slide and are capable of causing the hooks to engage or release the wire, and a cam for producing the combined movement of the tubes and bars and their relative movement, substantially as described and illustrated.

17. In bottle-wiring machines, means for twisting the wires after such have been placed upon the top and neck of the bottle consisting of a spindle in which holes are provided for the passage therethrough of tying-wires, such spindle having a spiral spring mounted thereupon which is wound on its rotation and has mounted thereupon a pinion in gear with a spur-wheel upon a rotating shaft, which spur-wheel is put into and out of gear by means of a clutch, arranged and operating substantially as described.

18. In a bottle-wiring machine, means for cutting the twisted wires comprising a swinging arm carrying a fixed knife, means for swinging said arm to bring the knife into proximity to the wires, a bar longitudinally movable of said swinging arm and carrying a knife, and means for reciprocating said bar, substantially as described.

19. In combination, the swinging arm having a fixed knife extending laterally from the end thereof, a lever-arm and cam for operating said swinging arm, a spring-pressed bar longitudinally movable on said swinging arm and having a knife-edge at its end moving toward and from said fixed knife, and a lever and cam for operating said sliding bar, substantially as described.

20. In bottle-wiring machines in which a loop is formed on wiring, means for bending down the loop consisting of levers, one of which is hinged and has its free end within a cam-plate by means of which the lever has a motion first outward then inward whereby the loop is bent down against the neck of the bottle without damage, substantially as described.

21. In a bottle-wiring machine, the combination with the wire-twisting mechanism, of means for bending down the twisted ends comprising a rock-shaft carrying a fixed arm, a second arm having a hinged connection with said rock-shaft and arranged to swing toward and from the bottle, a plate having a cam-groove in which the free end of said hinged arm or lever travels, and means for rocking the rock-shaft, substantially as described.

22. In a bottle-wiring machine, the combination with the capsule-applying mechanism, of a disk or table rotatably mounted upon a bracket or like portion of the machine and having a plurality of tubes or hoppers adapted to successively aline with an opening in said bracket, means operated from a moving part of the machine for rotating said disk or table, and means for holding said table against rotating until the hopper over the feed-opening has been emptied and then automatically releasing it to permit the next hopper to be brought into line, substantially as described.

23. In a bottle-wiring machine, the combination with the capsule-applying mechanism, of a rotatable disk or plate mounted upon a bracket or like part of the machine and having a plurality of hoppers adapted to successively aline with an opening in said bracket, a spring-pressed bar connected with said table and tending to rotate the same, and a projection on the bracket adjacent to the feed-opening and entering an annular groove in the disk, said projection being adapted to engage the bottom capsule in the hopper and hold the table against rotation until the respective hopper is emptied, substantially as described.

24. In a bottle-wiring machine, means for applying capsules to the corks prior to the wiring, comprising a capsule-lifting plunger arranged in line with the bottle to be wired, a hopper for the capsules, a carrier arranged to receive the capsule from the hopper, means for moving the carrier beneath the lifting-plunger and back again to the hopper after the capsule has been removed therefrom, and means for moving the plunger down to engage the capsule while the carrier is beneath said plunger and again moving it down to apply the capsule to the cork after the carrier has retreated, substantially as described.

In witness whereof we have hereunto set our hands in presence of two witnesses.

ROBERT MARTIN CHAMBERS.
CHARLES EDWARD CHAMBERS.

Witnesses:
WM. MCGOWAN,
ROBERT MCCUNE.